United States Patent Office 2,705,719
Patented Apr. 5, 1955

2,705,719

PREPARATION OF AROMATIC STEROIDS AND INTERMEDIATES THEREFOR

Martin Rubin, Silver Spring, Md., assignor to Chemical Specialties Co., Inc., New York, N. Y., a corporation of New Jersey No Drawing. Application November 6, 1953, Serial No. 390,720

6 Claims. (Cl. 260—397.3)

The present invention relates to a process for the production of cyclopentanophenanthrene compounds and to novel cyclopentanophenanthrene compounds.

More particularly, the present invention relates to a process for the conversion of cyclopentanophenanthrene compounds of the "pregnane" series to aromatic steroids. The present invention includes as an important step therein the tri-bromination of 3,20 ketones of the "pregnane" series and the production of a novel tri-bromo ketone and a novel trienone compound especially desirable as an intermediate for the production of therapeutically important steroids.

The novel trienone compounds, namely, Δ1, 4, 16-pregnatriene-3,20-dione is a valuable intermediate, for example, for the production of the progestational hormone 19-norprogesterone. As disclosed herein, the trienone may readily be converted to 3-hydroxyl-17-acetyl-Δ1, 3, 5, 16-estratetraene which could, in turn, be hydrogenated to 3-hydroxy-17-acetyl Δ1, 3, 5-estratriene as disclosed in J. A. C. S. 73, 1523 (1951). This last mentioned compound could then be converted to 19-norprogesterone as disclosed in United States application, Serial Number 250,036, filed October 5, 1951.

Although the halogenation of ketones of the character hereinafter referred to has been suggested previously as by Marker et al., United States Patent Number 2,369,065, the order of polyhalogenation there described was entirely different than that found in accordance with the present invention and would give rise to an entirely different compound than that discovered in accordance with the present invention. This may be due to the use of higher temperatures by Marker and also because Marker only describes the chlorination of the 3,20 ketones.

It has been found, in accordance with the present invention, that compounds characterized by the following general formula:

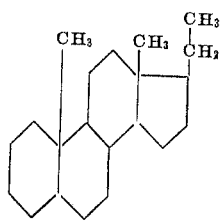

and particularly compounds of the above formula substituted at the 3 and 20 positions by oxygen or a group easily convertible to oxygen as, for example, the hydroxyl group, may be converted to aromatic Ring A compounds. Further, it has been found in accordance with the present invention that novel "pregnane" derivatives may be produced that are especially suitable as intermediates for the production of steroid hormones.

It has further been discovered that the polybromination of allopregnanedione-3,20 and preferably at temperatures below 20° C. results in bromination at the 2,17 and then 4 carbon positions in the order stated.

Among the preferred starting materials for the present process are Δ5,16 pregnanediene ol 3—one 20 and Δ5 pregnene ol 3—one 20. The former compound is readily available from the sapogenin sterols as for example by the procedure of J. A. C. S. 62, 3350 (1940).

The latter compound is formed in appreciable quantity in the chromic acid oxidation of cholesterol acetate dibromide and sitosterol acetate dibromide as by the process of United States Patent Number 2,244,968. Also the conversion if stigmasterol to this starting material may be readily carried out as described by Butenandt in United States Patent Number 2,332,438.

Either of the aforementioned starting materials when subjected to catalytic hydrogenation as for example with a platinum or palladium catalyst in a suitable solvent such as acetic acid may be reduced to the saturated sterol compound of the Ring A/B trans or allo configuration. After removal of the catalyst by filtration the reduced sterol may be readily oxidized as for example with chromic acid to the 3,20 diketone. The product of these transformations is the allopregnanedione-3,20. In the alternative allopregnanedione-3,20 from other sources may be used.

The process of the present invention in general, therefore, involves the bromination of allopregnanedione-3,20 preferably at temperatures below approximately 20° C., the allopregnanedione being dissolved in glacial acetic acid and brominated by the addition of a solution of bromine in acetic acid. Preferably in initiating the bromination, the sterol solution at room temperature or about 20° C. has added to it a small quantity of the bromination solution. After the initial quantity of bromine has reacted as evidenced by decoloration the sterol solution is then cooled in an ice bath to about 16°–18° C. and the remainder of the bromination solution is added at as rapid a rate as permitted by the decoloration. After the bromine addition has been completed the decolorized solution is then warmed to 50° C. and then allowed to cool to room temperature. Preferably sufficient bromine solution is used to amount to 3 mols of bromine for each mol of the sterol.

After the bromination is complete, the 2, 4, 17-tribromo-allopregnanedione-3,20 crystallizes from the reaction mixture and is then separated by filtration.

Instead of producing the 2, 4, 17 tribromo-allopregnanedione-3,20 by the tri-bromination of allopregnanedione-3,20 as previously described, it is within the scope of the present invention to start with 2, 4, 17-tribromo-allopregnanedione-3,20 prepared by other processes and subject the compound to the steps to be hereinafter described. As an example, the tribromo compound may be prepared by treating allopregnane one 3 ol 20 with two mols of bromine to produce 2, 4 dibromo-allopregnane one 3 ol 20 and this compound may be then oxidized to 2, 4 dibromo-allopregnanedione-3,20. This last compound can then be treated with one mol of bromine to give the 2, 4, 17-tribromo-allopregnanedione-3,20. In the alternative, allopregnane ol 3 one 20 can be treated with one mol of bromine to give 17 bromoallopregnane ol 3 one 20 and this last compound oxidized to 17 bromoallopregnanedione-3.20. Further bromination of this compound with two mols of bromine will then produce 2, 4, 17-tribromo-allopregnanedione-3,20.

Hydrogen bromide is suitably removed from the tribromo compound to produce the corresponding unsaturated compound, as by adding the tribromo compound to a refluxing solvent such as collidine. After refluxing for a suitable length of time, as for example, of the order of one to two hours the mixture is cooled, diluted with water and extracted with ether. The ether solution is washed free of the collidine with dilute acid such as hydrochloric acid, then washed with salt water and suitably dried. Thereafter the ether solution is concentrated to dryness and the crystalline residue purified by recrystallization as from methanol. The crystalline residue exhibits a melting point of about 215° C., and is believed to be Δ1, 4, 16 pregnatrienedione-3,20.

The Δ1,4,16 pregnatrienedione-3,20 is then subjected to thermal decomposition as by dissolving the same in mineral oil and dropping the mineral oil solution into a combustion tube packed with glass beads and electrically heated to a temperature of the order of 550° C. The mineral oil solution is then cooled to precipitate the product. As a result of the thermal treatment the methyl group at the 10 position is removed in the form of gases and Ring A changed to an aromatic Ring as can be determined by ultra-violet absorption data. The resultant product when purified by recrystallization was 3-hydroxy-17-acetyl Δ1,3,5,16 estratetraene. The reactions of the present invention may be indicated in general by the following equations:

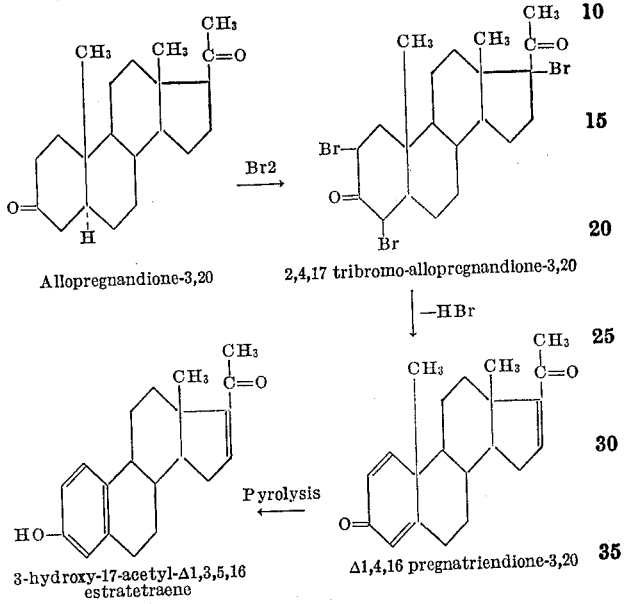

The following examples illustrate but are not intended to limit the present invention:

*Example I*

Allopregnane 3,20 dione: A suspension of 10 grams of Δ5,16 pregnadienol 3-one 20 in 200 cc. of 95% acetic acid was shaken in the presence of 1 gram of 10% palladium on charcoal, catalyst in an atmosphere of hydrogen. In the course of one hour slightly more than the amount of hydrogen calculated for two double bonds was absorbed. The catalyst was then removed by filtration and the clear filtrate treated at room temperature with an aqueous solution of 5 g. of chromic acid in 10 cc. of water. At the end of four hours the product was precipitated by dilution with water, filtered, washed well with water and then recrystallized from ethanol. Allopregnanedione-3,20, having a melting point of 196°–200° C., was obtained from the ethanol in a yield of 80% based on the starting material.

In place of the Δ5,16 pregnadienol 3-one 20, Δ5 pregnene ol 3-one 20 was utilized as the starting material. The procedure followed was entirely similar to that just given. In this case, the allopregnanedione-3,20 was formed in an overall yield of 85%.

*Example II*

2,4,17-tribromo-allopregnane-3,20 dione: A solution of 10 g. of allopregnanedione-3,20 in 200 cc. of glacial acetic acid was brominated by the addition of a solution of 15 g. of bromine in 25 cc. of acetic acid. The bromination was best effected by the following procedure: A small quantity (1 cc.) of the bromination solution was added to the allopregnanedione-3,20 solution at room temperature. When the bromine has reacted as was evidenced by the spontaneous decolorization which occurred, the sterol solution was cooled in an ice bath to about 16°–18° C. and the remainder of the bromination solution added at as rapid a rate as permitted by the decolorization. When the bromine addition was completed the decolorized solution was warmed to 50° and then allowed to cool to room temperature. The tribromo-allopregnanedione-3,20 crystallizes from the reaction mixture and may be separated by filtration. For purification a sample was recrystallized from ethanol. The product then has a decomposition point of around 197° C. The product was the 2,4,17-tribromo-allopregnanedione-3,20 having the structural formula:

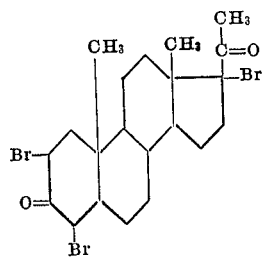

*Example III*

Δ1,4,16 pregnatrien 3,20 dione: To a refluxing solution of 25 cc. of collidine 5 g. of the powdered tribromo-pregnanedione of Example II, was added. After refluxing one and a half hours the mixture was cooled, diluted with water and extracted with liberal quantities of ether. The ether solution was washed free of collidine with dilute hydrochloric acid, then washed with salt water, dried over anhydrous magnesium sulfate and finally concentrated to dryness. The crystalline residue was purified by recrystallization from methanol and then had a melting point of about 215° C. The product had an ultra-violet absorption spectrum which showed a maximum at 241 Å. The product was Δ1,4,16 pregnatrienedione-3,20 having the following structural formula:

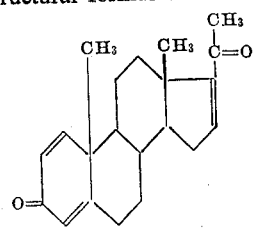

*Example IV*

Δ1,3,5,16–17 acetyl estratetraene-ol 3: Four grams of the Δ1,4,16 pregnatrien 3,20 dione obtained in Example III were dissolved in 200 cc. of medium viscosity mineral oil and passed through a 1¼ inch combustion tube packed with glass beads and electrically heated to an internal temperature of 550° C. The mineral oil solution of the triene was dropped into the combustion tube at the rate of 800 cc./hr. The pyrolysed mineral oil solution was then cooled. The product was 3-hydroxy-17-acetyl-Δ1,3,5,16-estratetraene having the following formula:

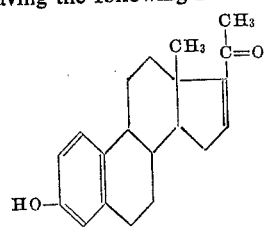

*Example V*

A 2% solution of 1,4,16-pregnatriene-3,20-dione in mineral oil was passed at a rate of 2 cc. per second through a glass tube filled with helices and heated to 600° C. After cooling overnight in the ice box, the precipitate was filtered and washed well with hexane to remove adhering mineral oil. Recrystallization from acetone yielded nearly colorless prisms of 30-hydroxy-17-acetyl-1,3,5,16-estratetraene with a melting point of 247°–248° C., $(\alpha)_D^{20}+118°$ (chloroform), ultra-violet maxima (in 95% ethanol solution) at 230 mμ (log E 4.20) and 280 mμ (log E 3.47) and minimum at 266 mμ (log E 3.29).

The present application is a continuation-in-part of application Serial Number 181,941, filed August 28, 1950, which is, in turn, a continuation-in-part of application Serial Number 90,564, filed April 29, 1949, both now abandoned.

I claim:
1. A process for the production aromatic steroids comprising brominating allopregnanedione-3,20 at temperatures below approximately 20° C., to substitute bromine at the 2, 4, and 17 positions, removing hydrogen bromide from the brominated product by refluxing with collidine to produce Δ1, 4, 16 pregnatrienedione-3,20 and heating the Δ1, 4, 16 pregnatrienedione-3,20 to remove the 10 methyl group therefrom and convert Ring A therein to an aromatic ring.

2. As a new product the 2, 4, 17-tribromoallopregnanedione-3,20 having the following structural formula:

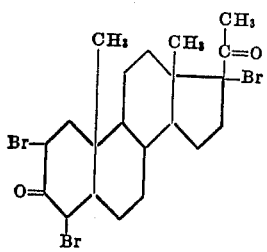

3. As a new product the Δ1, 4, 16 pregnatrienedione-3,20 having the following structural formula:

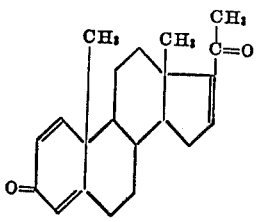

and a melting point of approximately 215° C.

4. A process for the production of tri-bromo hormone intermediates comprising adding bromine to a glacial acetic acid solution of allopregnanedione-3,20 while cooling the same to a temperature below approximately 20° C., and thereafter crystallizing 2, 4, 17-tribromo-allopregnanedione-3,20 from the solution.

5. A process for the production of tri-bromo hormone intermediates comprising adding bromine to a glacial acetic acid solution of allopregnanedione-3,20 while cooling the same to a temperature of 16°–18° C., and thereafter crystallizing 2, 4, 17-tribromo-allopregnanedione-3,20 from the solution.

6. A process for the production of Δ1, 4, 16-pregnatrienedione-3,20 at temperatures below approximately 20° C. to substitute bromine at the 2, 4 and 17 positions, and removing hydrogen bromide from the brominated product by refluxing with collidine.

References Cited in the file of this patent

Rubin et al., Jour. Am. Chem. Soc. 73, 2338–2340 (1951).

Djerassi, Jour. Am. Chem. Soc. 73, 1523–7 (1951).